Patented Sept. 28, 1943

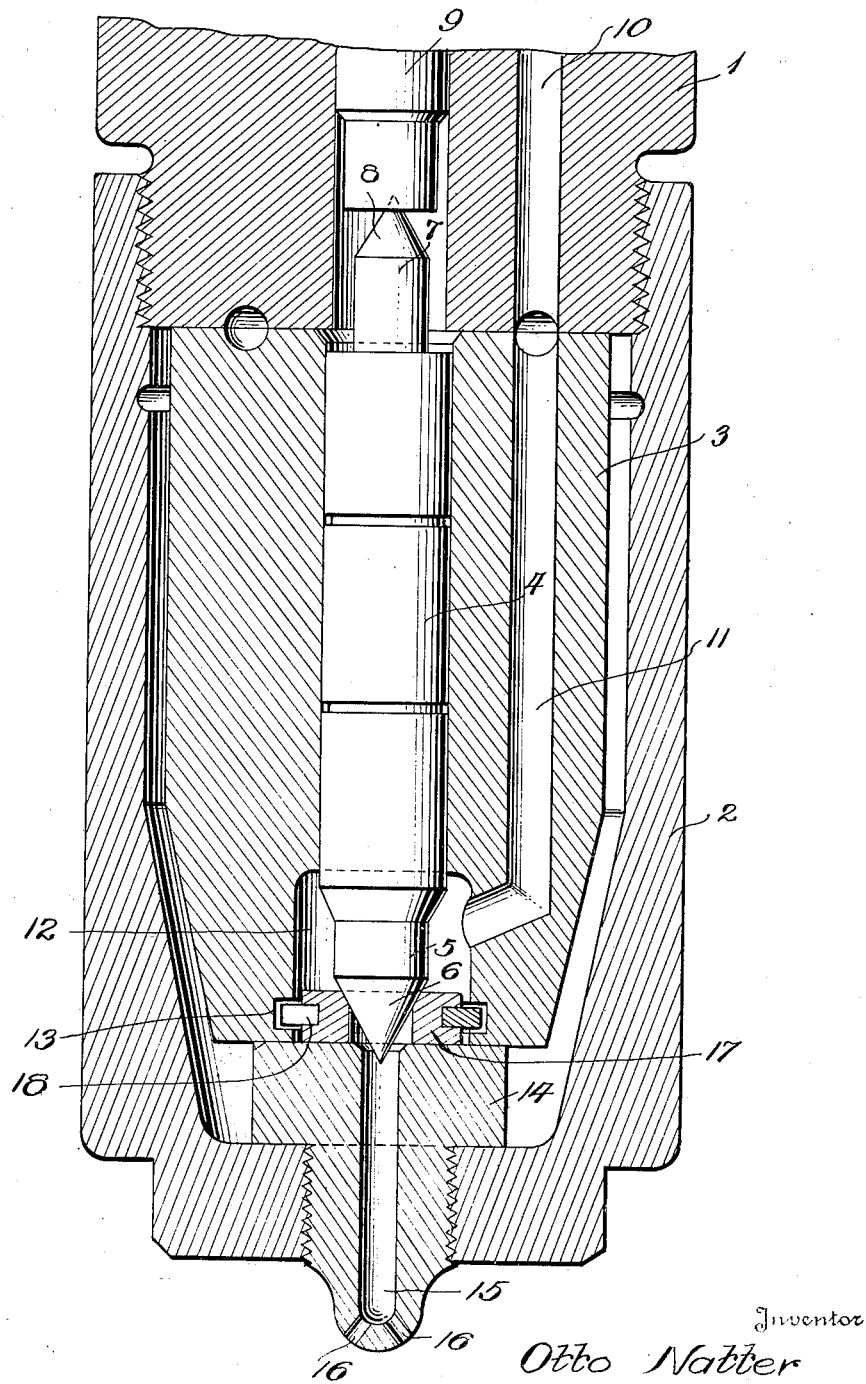

2,330,610

UNITED STATES PATENT OFFICE 2,330,610

NEEDLE VALVE AND SEAT THEREFOR

Otto Natter, Hofingen, Leonberg, Germany; vested in the Alien Property Custodian Application April 29, 1941, Serial No. 391,001
In Germany July 21, 1939

4 Claims. (Cl. 251—27)

My invention relates to a needle valve and seat therefor, and has particular reference to a valve construction including a self-centering or self-aligning valve seat.

While I have elected herein to illustrate and describe my present invention as applied to fuel injection nozzles of the needle valve type usually employed with internal combustion engines, it is to be understood that this invention is capable of application to valve structures generally and is particularly adaptable for use in any and all instances wherein a tapered or conical valve head is movable into and out of engagement with a cooperating valve seat and wherein it is essential to the proper and efficient closing of the valve that the valve head and valve seat be disclosed in accurate axial alignment.

It is an object of my invention to provide a valve seat adapted for cooperation with a valve head having a tapered or conical tip, and which valve seat is movable so as to receive the tapered or conical tip in proper and accurate axial alignment to effect a tight and effective seating of the valve head on the valve seat when the valve is moved to closed position.

It is an object of my invention to provide a valve seat for cooperation with a movable valve head having a tapered or conical tip and which valve seat is mounted in a valve casing in a manner such as to permit said valve seat to move in a direction normal to the direction of movement of the valve head, whereby said valve seat is self-centering and self-aligning with respect to the valve head as said head moves into sealing engagement with respect to the valve seat.

It is an object of my invention to provide a valve construction in which a valve head of the "needle" type is guided in its reciprocating movements within an accurately machined guide bore formed in the valve casing or in a part associated with said valve casing, and in which its cooperating valve seat is readily movable in a direction normal to the axis of reciprocation of the "needle," whereby the needle will tightly engage the valve seat without causing a bending or distortion of the "needle" or causing a binding of said "needle" within its guide bore.

It is an object of my invention to provide a valve construction of the character described above in which the valve seat surrounds an outlet or discharge opening formed in a plate-like member relatively loosely mounted within the valve casing so as to be movable in a direction normal to the direction of movement of the valve head and in which said plate-like member is supported on a stationary portion of the valve casing or on a stationary part mounted therein.

It is a further object of my invention to provide a valve construction of the character above described in which the movable plate-like member carrying the valve seat is subject to the pressure of the fluid in a pressure chamber or pocket positioned above the plate-like member, whereby said plate-like member is forced by the pressure of the fluid into fluid-tight contact with its underlying stationary supporting surface.

It is a still further object of my invention to provide a valve construction of the character above described which is cheap and easy to manufacture, simple in construction and operation, strong and durable, and highly efficient in the purposes for which designed.

In the accompanying drawing wherein for the purpose of illustration I have shown a preferred embodiment of my present invention, the single figure is a vertical view of so much of a fuel injection nozzle as is necessary to illustrate the said invention, the parts of the valve casing and the valve seat and its supporting structure being shown in section while the "needle" and its actuating rod or pin are shown in elevation.

Referring in detail to the accompanying drawing, the reference numeral 1 designates the lower end portion of the body of a fuel injection nozzle of the type generally employed with internal combustion engines, the lower end of this body portion being externally threaded to receive thereon a hollow casing 2, within which is mounted a sleeve 3 through which extends an accurately machined and dimensioned centrally positioned guide bore for a "needle" 4. The "needle" 4 is mounted for reciprocation within the guide bore in the sleeve 3 and is so machined and dimensioned as to have a relatively fluid-tight sliding fit within said bore. The lower end of the "needle" 4 is provided with a reduced portion 5 which terminates in a tapered or conical tip 6 adapted to cooperate with a novel self-centering or self-aligning valve seat to be hereinafter described. The upper end of the "needle" 4 is preferably provided with a reduced portion 7 which terminates in a tapered or conical tip 8 which is engaged by a valve actuating rod 9 weighted by a relatively strong compression spring (not shown).

The body 1 and the sleeve 3 are provided with aligned fuel passages 10 and 11 through which fuel is forced under pressure from a fuel pump or other source of fuel under pressure. The lower end of the fuel passage 10 communicates with a pressure chamber or pocket 12 formed in the lower end of the sleeve 3 and of a greater diameter than the diameter of the "needle" guide bore which extends through said sleeve, it being noted that the reduced end 5 and the tapered or conical tip 6 of the "needle" 4 are disposed within, and reciprocate within, this pocket or chamber 12. The wall defining the pocket or chamber 12 is provided near the lower end of said chamber with an annular groove or channel 13.

Interposed between the lower end of the sleeve 3 and the inner, lower end of the hollow casing 2 is a nozzle cap 14 provided with an axially disposed fuel passage 15 which terminates at its lower end in spray holes 16, it being noted that this nozzle cap 14 is threaded through an aperture in the lower end of the casing 2 and that its upper surface, which is a carefully ground, smooth, plane surface, closes the lower end of the pressure chamber 12 and is in fluid-tight engagement with the lower end of the sleeve 3. The clamping of the nozzle cap 14 between the lower end of the sleeve 3 and the inner, lower end of the hollow casing 2 is readily effected by screwing the casing 2 upwardly upon the lower end of the body portion 1 of the fuel injection nozzle.

The novel self-centering and self-aligning valve seat of my present invention comprises an annular plate-like member 17 of a diameter less than that of the pressure chamber or pocket 12, which plate-like member is preferably machined on its upper surface to provide a conical valve seat surrounding the opening in said plate-like member and is ground on its lower surface to form a smooth, plane surface to engage and cooperate with the ground upper surface of the nozzle cap 14. The periphery of the member 17 is grooved to receive therein a retaining ring 18 which functions as a means for loosely retaining the member 17 within the chamber or pocket 12. The retaining ring 18 may take the form of a split, flexible, spring-ring which may be compressed into the annular groove in the member 17 and said member and compressed ring moved axially into the lower open end of the pressure chamber or pocket 12, whereupon the said ring will expand into the groove 13, it being understood that the normal or expanded diameter of said ring is always less than the diameter of the groove 13, as shown in the accompanying drawing, so that the plate 17 can readily partake of movements in a direction normal to the axis of reciprocation of the needle 4. If desired the retaining ring 18 may be made of some flexible material such as rubber, leather, fabric or the like so that the member 17 with the ring 18 applied in the annular groove in said member, may be moved axially into the lower open end of the pressure chamber or pocket 12 to a position where said ring will enter into the groove 13. It is to be noted that in all instances the diameter of the retaining ring 18 is less than the diameter of the annular groove 13, and that, preferably, the height of the groove 13 exceeds the thickness of the said ring, so that the plate-like member 17 is movable axially as well as radially within the chamber.

It will be readily apparent from the above description that the component parts of the fuel injection nozzle may be assembled by threading the nozzle cap 14 into an opening in the lower end of the casing 2; placing the "needle" 4 in the guide bore formed in the sleeve; placing the plate-like member 17 in the pocket or chamber 12 with the retaining ring 18 carried thereby disposed within the groove 13; placing the upper end of the sleeve 3 in contact with the lower end of the body portion 1 of the nozzle with the fuel passages 10 and 11 in alignment; and then screwing the casing 2 onto the lower end of the body portion 1 until the sleeve 3 is pressed tightly against said body portion and the upper end of the nozzle cap 14 is pressed tightly against the lower end of the sleeve 3. The rod or pin 9 is then passed through the body portion 1 of the nozzle and into contact with the upper end 8 of the "needle" 4 and is weighted by a relatively strong compression spring (not shown), which spring normally serves to force the tapered or conical tip 7 into tight sealing contact with the valve seat in the annular plate-like member 17. The fuel injection nozzle thus assembled, is then inserted within the injection nozzle opening in the cylinder of an internal combustion engine with the spray holes 16 disposed in or communicating with, the compression space of the said cylinder. The fuel passages 10 and 11 are then connected to a fuel pump or other supply of fuel under pressure.

Referring now to the operation of the fuel injection nozzle above described and assuming that the valve is in closed position as illustrated in the drawing, the fuel is forced under a relatively high pressure through passages 10 and 11 and into the fuel chamber or pocket 12, wherein the pressure of the fuel forces the plate-like member 17 into firm, fluid-tight contact with the upper surface of the nozzle cap 14, it being obvious that the slight clearance between the upper and lower walls defining the annular groove 13 and the retaining ring 18 permits of relative movement between the said plate-like member 17 and the underlying supporting surface of the nozzle cap 14. When the pressure of the fuel reaches a degree sufficiently high to overcome the downward pressure of the spring acting on the rod 9 and "needle" 4, this fuel pressure lifts the "needle" against the pressure of the spring which loads the rod 9 and causes the tapered or conical tip 6 of the "needle" to be lifted from engagement with its cooperating valve seat in the plate-like member 17 so that the valve will be opened and fuel will pass under pressure from the chamber 12, through the passage 15, and through the spray holes 16 into the engine cylinder. Upon a decrease in the pressure of the fuel entering the chamber 12 through the fuel passages 10 and 11, the spring (not shown) forces the rod 9 and the "needle" 4 downwardly until the tapered or conical tip 6 of the "needle" is again forced into firm and intimate contact with its cooperating valve seat in the member 17. If the valve seat and "needle" are not in accurate alignment, the tapered or conical tip 6 of the needle, upon entering the valve seat, will cause the plate-like member 17 to move in a direction normal to the axis of reciprocation of the "needle" 4 so that the tapered or conical tip 6 of the "needle" will properly and effectively engage the valve seat to insure a complete closing of the valve, it being obvious that the clearance between the periphery of the retaining ring 18 and the inner wall of the annular groove 13 permits relative movement between the said plate-like member 17 and the walls defining the chamber or pocket 12.

Hence it will be seen that I have provided a self-centering or self-aligning valve seat for valves, particularly valves of the reciprocating "needle" type such as are frequently employed in fuel injection nozzles for internal combustion engines. The provision of such a valve seat prevents any bending or distortion of the "needle" and effectively overcomes any tendency for the "needle" to bind in its guide bore. These especially desirable results are accomplished by the provision of a plate-like member 17 disposed in the chamber or pocket 12 with sufficient clearance to permit the said plate-like member to readily adjust itself to a position wherein the "needle" will be in accurate axial alignment with the valve seat. By virtue of the coacting ground, smooth, plane surfaces on the lower end of the plate-like member 17 and on the upper end of the nozzle cap 14, the pressure existing in the fuel chamber or pocket 12 is sufficient to force these parts into contact with each other to form a fluid-tight seal therebetween. From the standpoint of ease of manufacture, it is significant to note that the guide bore and the fuel chamber or pocket in the sleeve 3 pass completely through the said sleeve, and the plate 17 and the valve seat formed therein may be readily manufactured as a separate structural part without the necessity of insuring that the guide bore and the valve seat are in accurate axial alignment, as the manner of constructing and arranging the plate-like member 17 is such that there is an automatic centering of the valve seat formed in the plate-like member as the needle "4" approaches its fully closed position with respect to its cooperating valve seat. Even though the plate-like member 17 is movable with respect to the supporting surface on the upper end of th nozzle cap 14 to permit the self-centering or self-aligning of the valve seat as above described, the contacting ground surfaces, together with the pressure of the fuel within the fuel chamber or pocket 12 and the pressure of the "needle" affords an effective fluid-tight seal between these relatively movable, contacting parts.

It is to be understood that the form of my invention shown and described herein is to be taken as a preferred embodiment of the invention and that numerous changes may be made in the shape, arrangement and construction of parts without departing from the spirit of the invention or the scope of the subjoined claims. It will be obvious that the present invention is not restricted to use in connection with needle valves but that the same is capable of application to any and all valve constructions in which a valve head is provided with a tapered or conical tip adapted to be moved into contact with a cooperating valve seat when the valve is moved to closed position.

Having thus described my invention, I claim:

1. A valve comprising a casing having a chamber therein, the wall defining said chamber having a groove therein, a movable valve head having a tapered tip and mounted for reciprocation in said chamber, a plate having a valve seat formed therein and having a groove extending around the periphery thereof, said plate being mounted for movement within said chamber in a plane normal to the axis of reciprocation of said valve head and detachable means extending between and into said grooves, for mounting said plate within said chamber, said detachable means maintaining said plate in a position such that the valve seat therein is in substantial axial alignment with the tapered tip of the valve head and permitting said plate to move in a plane normal to the axis of reciprocation of said valve head to bring the valve seat therein into accurate axial alignment with the tapered tip as said tip moves toward closed position on said valve seat.

2. A valve comprising a casing having a guide bore therein and a chamber, having a wall circular in cross section, at one end of the guide bore, and said chamber wall having an annular groove therein, a movable valve head having a tapered tip and mounted for reciprocation within the guide bore and chamber, an annular plate having a valve seat formed therein and having an annular groove extending around the periphery thereof, said plate being of less diameter than the diameter of said chamber and detachable connecting means extending into said grooves for mounting said plate within said chamber, said means maintaining said plate in a position such that the valve seat therein is in substantial axial alignment with said tapered tip of the valve head and permitting said plate to move in a direction such as to bring the valve seat therein into accurate axial alignment with the tapered tip as said tip moves toward closed position on said valve seat.

3. A valve as defined in claim 2 wherein the detachable connecting means comprises a split, flexible spring retaining-ring having a normal or expanded diameter less than the diameter of the groove in said chamber wall.

4. A valve as defined in claim 2 wherein the detachable connecting means comprises a flexible retaining-ring of normal diameter less than the diameter of the groove in the chamber wall.

OTTO NATTER.